United States Patent [19]

Stashko

[11] Patent Number: 5,366,325
[45] Date of Patent: Nov. 22, 1994

[54] END MILL WITH POSITIVE RAKE INDEXABLE INSERT

[75] Inventor: Daniel R. Stashko, Holly, Mich.

[73] Assignee: Valenite Inc., Madison Heights, Mich.

[21] Appl. No.: 627,450

[22] Filed: Jul. 26, 1991

Related U.S. Application Data

[63] Continuation of Ser. No. 259,647, Oct. 19, 1988, abandoned.

[51] Int. Cl.$^5$ ............................................... B23C 5/20
[52] U.S. Cl. ...................................... 407/42; 407/113
[58] Field of Search .............. 407/34, 42, 48, 113–116

[56] References Cited

U.S. PATENT DOCUMENTS 3,588,977  6/1971  Bellingham et al. ............ 407/113 X
4,699,549  10/1987  Shimomura et al. ................. 407/42

*Primary Examiner*—Steven C. Bishop
*Attorney, Agent, or Firm*—Bill C. Panagos

[57] ABSTRACT

End mill with indexable insert located ahead of center with positive and axial radial rake provided by a top face configured with a diagonal concave cylindrical arc providing two indexable high cutting points.

8 Claims, 1 Drawing Sheet

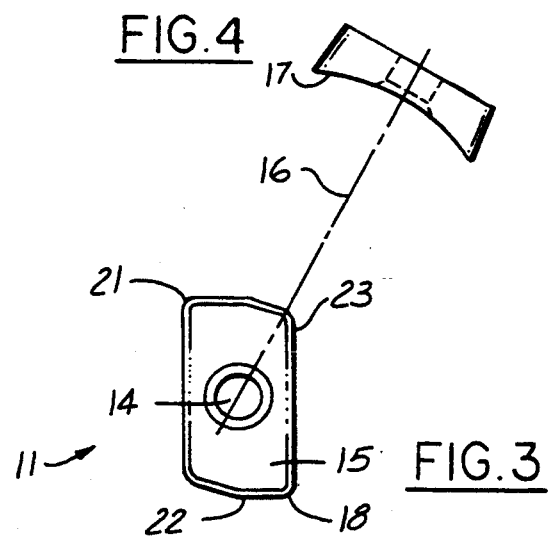
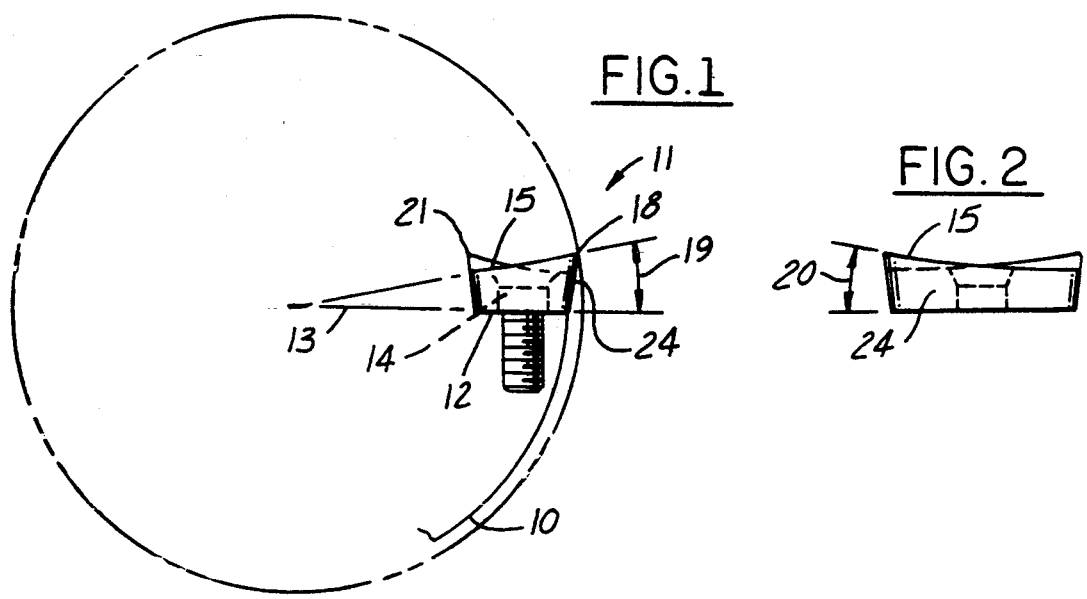

END MILL WITH POSITIVE RAKE INDEXABLE INSERT

This is a continuation of copending application Ser. No. 07/259,647, filed on Oct. 19, 1988, now abandoned.

BACKGROUND OF THE INVENTION

In the construction of indexable insert milling cutters, there has always been a great difficulty in designing positive rakes into small diameter end mills particularly with flat top inserts. The major problem has been to achieve radial clearance and to preserve sufficient body mass under the insert. When the insert is placed ahead of center in order to conserve the body mass for support, a flat top insert so positioned results in negative radial rake; also with flat tops. The only way to achieve positive axial rake is to place the insert at an angle to the cutter axis which again eliminates more of the body mass.

BRIEF DESCRIPTION OF THE PRESENT INVENTION

The present embodiment positions the insert ahead of center in order to conserve the body mass for support and provides both positive axial and radial rakes by providing a radius diagonally through the insert top. The concave cylindrical arc configuration with high point extremities at the cutting points provides two index positions in a typical end mill application with the base of the insert installed in a radial plane with a central holddown screw.

Optionally, the insert may be configured to provide neutral or less negative rakes than is possible with flat top construction.

BRIEF DESCRIPTION OF THE DRAWINGS

FIG. 1 is a schematic end view of an end mill illustrating the installed position of the insert;

FIG. 2 is a side elevation corresponding to FIG. 1;

FIG. 3 is a plan view corresponding to FIG. 1

FIG. 4 is a diagonal projection illustrating the cylindrical arc curvature provided on the face of the insert.

DETAILED DESCRIPTION OF PREFERRED EMBODIMENT

End mill 10 is illustrated schematically with a typical installation of indexable insert 11 installed with flat bottom 12 on radial plane 13 utilizing central holddown screw 14 to locate the insert on a bottom seat against shoulder walls in a conventional manner, not shown. Cylindrical surface 15 extending along diagonal line 16 is provided with a circular arc 17 resulting in active high cutting point 18 extending with positive radial rake 19 and positive axial rake 20 with a like second indexable cutting point 21. Respective cutting edges 22 and 23 extending generally normal and parallel to the axis of the end mill may be employed to cut substantially right angle shoulders in materials best suited to positive rake cutting action with chip flow curled by the concave curvature top face of the insert. Side walls 24 may extend normal to bottom surface 12 or, preferably, at a relief angle as shown.

Optionally, any appropriate number of equally circumferentially spaced inserts may be installed in the end mill; also, optionally, positioning may be varied to any desired neutral or reduced negative rake angles utilizing the principal of providing compound more positive radial and axial rake angles through the simple configuration of a diagonal cylindrical concave top face.

I claim:

1. A generally rectangular indexable insert having a flat seating surface and an opposite top face, said top face having a diagonally concave arcuate surface which provides two diagonally opposite, indexable, generally right angle high point cutting corners, wherein said top face is entirely concave.

2. An end mill in combination with the indexable insert as set forth in claim 1, wherein said end mill is rotatable about an axis, and said top face is located ahead of a radial plane of said end mill substantially coextensive with or parallel to said seating surface.

3. The end mill of claim 2, including a cooperating end mill seating surface for said insert extending in a substantially radial plane.

4. The end mill of claim 2, wherein an active one of said cutting corners of said insert has two right angle cutting edges disposed substantially perpendicular to and parallel with, respectively, the axis of said end mill at an outer corner extremity of said end mill.

5. The end mill of claim 4, wherein said right angle cutting edges slope from said active cutting corner toward said insert seating surface.

6. The end mill of claim 5, wherein said right angle cutting edges extend at positive radial and axial rake angles.

7. The end mill of claim 1, wherein said concave arcuate surface is formed as a circular arc segment of a cylinder.

8. The end mill of claim 4, wherein said insert is substantially elongated along said axis.

* * * * *